(12) United States Patent
Adams

(10) Patent No.: US 7,147,955 B2
(45) Date of Patent: Dec. 12, 2006

(54) FUEL CARTRIDGE FOR FUEL CELLS

(75) Inventor: Paul Adams, Monroe, CT (US)

(73) Assignee: Societe BIC, Clichy Cedex (FR)

( * ) Notice: Subject to any disclaimer, the term of this patent is extended or adjusted under 35 U.S.C. 154(b) by 349 days.

(21) Appl. No.: 10/356,793

(22) Filed: Jan. 31, 2003

(65) Prior Publication Data

US 2004/0151962 A1    Aug. 5, 2004

(51) Int. Cl.
*H01M 2/02*    (2006.01)

(52) U.S. Cl. ........................................................ 429/34

(58) Field of Classification Search ................. 429/34, 429/12

See application file for complete search history.

(56) References Cited

U.S. PATENT DOCUMENTS

| | | | |
|---|---|---|---|
| 3,253,430 A * | 5/1966 | Piffath ........................ 431/277 |
| 3,774,243 A | 11/1973 | Ng et al. | |
| 3,923,426 A | 12/1975 | Theeuwes | |
| 4,294,891 A | 10/1981 | Yao et al. | |
| 4,316,233 A | 2/1982 | Chato et al. | |
| 4,383,265 A | 5/1983 | Kohashi | |
| 4,387,382 A | 6/1983 | Kohashi | |
| 4,396,925 A | 8/1983 | Kohashi | |
| 4,419,663 A | 12/1983 | Kohashi | |
| 4,420,544 A | 12/1983 | Lawson et al. | |
| 4,463,066 A | 7/1984 | Adlhart et al. | |
| 4,463,068 A | 7/1984 | Cohn et al. | |
| 4,479,135 A | 10/1984 | Kohashi | |
| 4,481,520 A | 11/1984 | Esaki et al. | |
| 4,525,727 A | 6/1985 | Kohashi et al. | |
| 4,562,123 A | 12/1985 | Shimizu et al. | |
| 5,004,424 A | 4/1991 | Larminie | |
| 5,135,480 A | 8/1992 | Bannon et al. | |
| 5,180,288 A | 1/1993 | Richter et al. | |
| 5,336,062 A | 8/1994 | Richter | |
| 5,364,711 A | 11/1994 | Yamada et al. | |
| 5,501,914 A | 3/1996 | Satake et al. | |
| 5,534,363 A | 7/1996 | Sprouse et al. | |

(Continued)

FOREIGN PATENT DOCUMENTS

EP    0 282 982 A2    9/1988

(Continued)

OTHER PUBLICATIONS

Sim et al, Fabrication Of Micro Power Source Using A Micro Direct Methanol Fuel Cell For The Medical Application, Korea, 2001 IEEE, pp. 341-344.

(Continued)

*Primary Examiner*—Patrick Joseph Ryan
*Assistant Examiner*—Thomas H. Parsons
(74) *Attorney, Agent, or Firm*—The H.T. Than Law Group

(57) ABSTRACT

A versatile fuel cartridge for storing methanol and water, methanol/water mixture or methanol/water mixtures of varying concentrations is disclosed. The present invention utilizes a filler insert preferably occupying a small portion of the volume of the fuel cartridge, so that the fuel cartridge may hold more fuel to ensure a longer life. The filler insert is capable of wicking and transporting the fuel to the MEA. Additionally, the filler insert remains in physical contact with the fuel in any orientation of the fuel cartridge and at any fuel level in the fuel cartridge. The fuel cartridge may have more than one chamber, and preferably each chamber contains a different concentration of fuel. Optionally, the fuel cartridge may include a pump to initiate fuel flow from the fuel reservoir. The pump may regulate the flow of fuel and importantly to shut off the flow of fuel, when necessary.

29 Claims, 6 Drawing Sheets

U.S. PATENT DOCUMENTS

| | | |
|---|---|---|
| 5,599,638 A | 2/1997 | Surampudi et al. |
| 5,630,709 A | 5/1997 | Bar-Cohen |
| 5,632,876 A | 5/1997 | Zanzucchi et al. |
| 5,659,171 A | 8/1997 | Young et al. |
| 5,660,703 A | 8/1997 | Dasgupta |
| 5,709,961 A | 1/1998 | Cisar et al. |
| 5,723,228 A | 3/1998 | Okamoto |
| 5,723,229 A | 3/1998 | Scheifers et al. |
| 5,759,712 A | 6/1998 | Hockaday |
| 5,773,162 A | 6/1998 | Surampudi et al. |
| 5,795,496 A | 8/1998 | Yen et al. |
| 5,846,396 A | 12/1998 | Zanzucchi et al. |
| 5,932,365 A | 8/1999 | Lin et al. |
| 5,945,231 A | 8/1999 | Narayanan et al. |
| 5,961,298 A | 10/1999 | Bar-Cohen et al. |
| 5,976,725 A | 11/1999 | Gamo et al. |
| 5,992,008 A | 11/1999 | Kindler |
| 6,054,228 A | 4/2000 | Cisar et al. |
| 6,057,051 A | 5/2000 | Uchida et al. |
| 6,068,449 A | 5/2000 | Roach |
| 6,069,392 A | 5/2000 | Tai et al. |
| 6,136,463 A | 10/2000 | Kindler et al. |
| 6,146,781 A | 11/2000 | Surampudi et al. |
| 6,150,047 A | 11/2000 | Yen et al. |
| 6,171,721 B1 | 1/2001 | Narayanan et al. |
| 6,194,092 B1 | 2/2001 | Ohara et al. |
| 6,221,226 B1 | 4/2001 | Kopf-Sill |
| 6,221,523 B1 | 4/2001 | Chun et al. |
| 6,228,518 B1 | 5/2001 | Kindler |
| 6,241,480 B1 | 6/2001 | Chu et al. |
| 6,248,460 B1 | 6/2001 | Surampudi et al. |
| 6,254,748 B1 | 7/2001 | Surampudi et al. |
| 6,259,971 B1 | 7/2001 | Mitchell et al. |
| 6,265,093 B1 | 7/2001 | Surampudi et al. |
| 6,268,077 B1 | 7/2001 | Kelley et al. |
| 6,270,643 B1 | 8/2001 | Finnebraaten |
| 6,277,447 B1 | 8/2001 | Chun et al. |
| 6,291,093 B1 | 9/2001 | Kindler et al. |
| 6,299,744 B1 | 10/2001 | Narayanan et al. |
| 6,303,244 B1 | 10/2001 | Surampudi et al. |
| 6,306,285 B1 | 10/2001 | Narayanan et al. |
| 6,312,846 B1 | 11/2001 | Marsh |
| 6,326,097 B1 | 12/2001 | Hockaday |
| 6,326,211 B1 | 12/2001 | Anderson et al. |
| 6,344,120 B1 | 2/2002 | Haswell et al. |
| 6,368,492 B1 | 4/2002 | Narayanan et al. |
| 6,380,126 B1 | 4/2002 | Finkelshtain et al. |
| 6,391,486 B1 | 5/2002 | Narayanan et al. |
| 6,406,605 B1 | 6/2002 | Moles |
| 6,410,180 B1 | 6/2002 | Cisar et al. |
| 6,418,968 B1 | 7/2002 | Pezzuto et al. |
| 6,420,059 B1 | 7/2002 | Surampudi et al. |
| 6,432,284 B1 | 8/2002 | Narayanan et al. |
| 6,447,727 B1 | 9/2002 | Parce et al. |
| 6,447,941 B1 | 9/2002 | Tomimatsu et al. |
| 6,447,945 B1 | 9/2002 | Streckert et al. |
| 6,460,733 B1 | 10/2002 | Acker et al. |
| 6,465,257 B1 | 10/2002 | Parce et al. |
| 6,471,841 B1 | 10/2002 | Nikiforov et al. |
| 6,475,441 B1 | 11/2002 | Parce et al. |
| 6,482,306 B1 | 11/2002 | Yager et al. |
| 6,485,273 B1 | 11/2002 | Goodwin-Johansson |
| 6,506,513 B1 | 1/2003 | Yonetsu et al. |
| 6,554,591 B1 | 4/2003 | Dai et al. |
| 6,599,652 B1 | 7/2003 | Matejcek |
| 6,604,598 B1 | 8/2003 | Rohde et al. |
| 6,645,655 B1 | 11/2003 | McNamee et al. |
| 2001/0020589 A1 | 9/2001 | Kopf-Sill |
| 2001/0051293 A1 | 12/2001 | Narayanan et al. |
| 2002/0008029 A1 | 1/2002 | Williams et al. |
| 2002/0008032 A1 | 1/2002 | Hayenga |
| 2002/0018925 A1 | 2/2002 | Merin et al. |
| 2002/0023841 A1 | 2/2002 | Ahn et al. |
| 2002/0076599 A1 | 6/2002 | Neutzler |
| 2002/0086193 A1 | 7/2002 | Acker et al. |
| 2002/0102451 A1 | 8/2002 | Acker et al. |
| 2001/0127451 | 9/2002 | Cao et al. |
| 2002/0122966 A1 | 9/2002 | Acker et al. |
| 2002/0127141 A1 | 9/2002 | Acker |
| 2002/0166592 A1 | 11/2002 | Liu et al. |
| 2002/0192526 A1 | 12/2002 | Beckmann et al. |
| 2003/0008193 A1 | 1/2003 | Kinkelaar et al. |
| 2003/0082427 A1 | 5/2003 | Prasad et al. |
| 2003/0095872 A1 | 5/2003 | McNamee et al. |
| 2004/0001987 A1 | 1/2004 | Kinkelaar et al. |
| 2004/0001989 A1 | 1/2004 | Kinkelaar et al. |
| 2004/0001991 A1 | 1/2004 | Kinkelaar et al. |
| 2004/0001993 A1 | 1/2004 | Kinkelaar et al. |

FOREIGN PATENT DOCUMENTS

| | | |
|---|---|---|
| EP | 1280219 A2 | 1/2003 |
| EP | 1280219 A3 | 8/2003 |
| JP | 59-193111 | 1/1984 |

OTHER PUBLICATIONS

Thopasridharan et al, Electroosmotic Pump, student project, Spring 2002, Tennessee Technological University.

Yao et al, A Large Flowrate Electroosmotic Pump With Micron Pores, Published at Proceedings of IMECE 2001 ASME International Mechanical Engineering Congress and Exposition, Nov. 11-16, 2001, New York, NY, pp. 1-7.

Zeng et al, Electroosmotic Flow Pumps With Polymer Frits, published in Sensors and Actuators B 82 (2002) 209-212.

International Search Report and Written Opinion of the International Searching Authority, mailed Feb. 6, 2006. For PCT/IB2004/001214, international filing date Jan. 26, 2004.

* cited by examiner

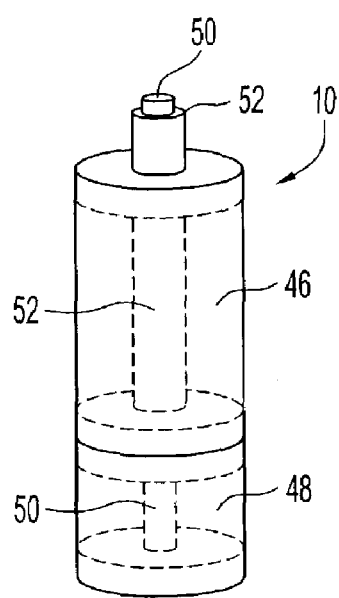 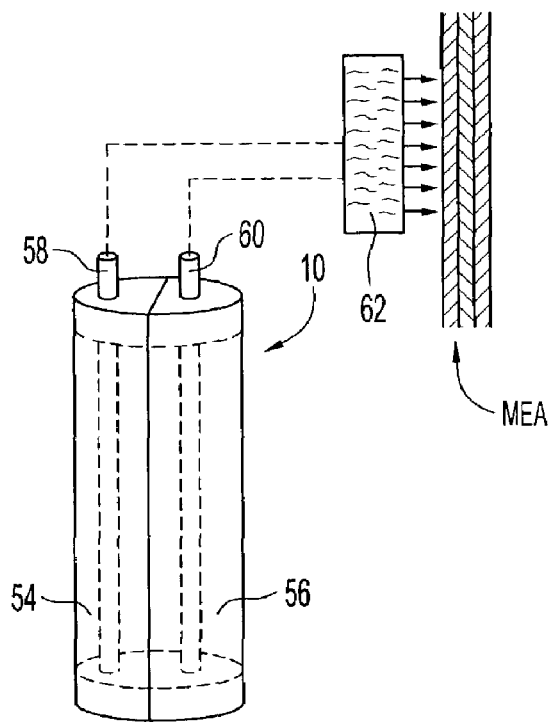
FIG. 9  FIG. 10
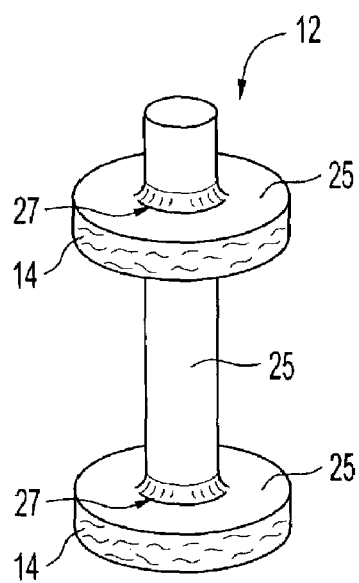
FIG. 11

FUEL CARTRIDGE FOR FUEL CELLS

FIELD OF THE INVENTION

This invention generally relates to fuel cartridges for fuel cells, and more particularly this invention relates to disposable and refillable fuel cartridges. This invention also relates to fuel cartridges for direct methanol fuel cells.

BACKGROUND OF THE INVENTION

Fuel cells are devices that directly convert chemical energy of reactants, i.e., fuel and oxidant, into direct current (DC) electricity. For an increasing number of applications, fuel cells are more efficient than conventional power generation, such as combustion of fossil fuel and more efficient than portable power storage, such as lithium-ion batteries.

In general, fuel cell technologies include a variety of different fuel cells, including alkali fuel cells, polymer electrolyte fuel cells, phosphoric acid fuel cells, molten carbonate fuel cells and solid oxide fuel cells. Today's more important fuel cells can be divided into three general categories, namely fuel cells utilizing compressed hydrogen ($H_2$) as fuel, proton exchange membrane (PEM) fuel cells that use methanol ($CH_3OH$) reformed into hydrogen as fuel, and PEM fuel cells that use methanol ($CH_3OH$) fuel directly ("direct methanol fuel cells" or DMFC). Compressed hydrogen is generally kept under high pressure, and is therefore difficult to handle. Furthermore, large storage tanks are typically required, and cannot be made sufficiently small for consumer electronic devices. On the other hand, fuel cells using methanol reformats require reformers and other vaporization and auxiliary systems thereby increasing the size and complexity of methanol-reformat based fuel cells. DMFC is the simplest and potentially smallest fuel cell, and holds the most promising power application for consumer electronic devices.

DMFC for relatively larger applications typically comprises a fan or compressor to supply an oxidant, typically air or oxygen, to the cathode electrode, a pump to supply a water/methanol mixture to the anode electrode and a membrane electrode assembly (MEA). The MEA typically includes a cathode, a PEM and an anode. During operation, the water/methanol fuel liquid mixture is supplied directly to the anode, and the oxidant is supplied to the cathode. The chemical-electrical reaction at each electrode and the overall reaction for the fuel cell are described as follows:

Reaction at the anode:

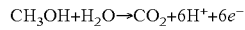

Reaction at the cathode:

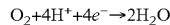

The overall fuel cell reaction:

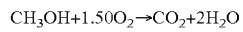

Due to the migration of the hydrogen ions ($H^+$) through the PEM from the anode through the cathode and due to the inability of the free electrons($e^-$) to pass through the PEM, the electrons must flow through an external circuit, which produces an electrical current through the external circuit. The external circuit may be any useful consumer electronic devices, such as mobile or cell phones, calculators, personal digital assistants and laptop computers, among others. DMFC is discussed in U.S. Pat. Nos. 5,992,008 and 5,945,231, which are incorporated by reference in their entireties. Generally, the PEM is made from a polymer, such as Nafion® available from DuPont, which is a perfluorinated material having a thickness in the range of about 0.05 mm to about 0.50 mm. The anode is typically made from a Teflonized carbon paper support with a thin layer of catalyst, such as platinum-ruthenium, deposited thereon. The cathode is typically a gas diffusion electrode in which platinum particles are bonded to one side of the membrane.

One of the most important features for DMFC application is fuel storage. Another important feature is to regulate the transport of fuel out of the fuel cartridge to the MEA. To be commercially useful, DMFC systems must have the capability of storing sufficient fuel to satisfy the consumers' normal usage. For example, for mobile or cell phones, for notebook computers, and for personal digital assistants (PDAs), fuel cells need to power these devices for at least as long as the current batteries, and preferably much longer. Additionally, the DMFC should have easily replaceable or refillable fuel tanks to minimize or obviate the need for lengthy recharges required by today's rechargeable batteries.

The patent literature contains no specific discussion of non-pressurized portable fuel tank or fuel storage for fuel cells. U.S. patent application publication no. U.S. 2002/0127451 A1 discloses a compact PEM fuel cell that stores methanol fuel in upstanding circular tank(s) and vents the by-product $CO_2$ back into the tank to pressurize same. This fuel tank further comprises a release valve to prevent the over-pressurization of the tank and a fuel intake valve to add fuel. The fuel tank comprises a porous layer to wick the water/methanol fuel mixture by capillary action to the anode terminal of the PEM. However, this porous layer cannot remain in contact with the fuel in positions other than vertical or at a slight angle from vertical. Hence this fuel tank cannot be used in all orientations.

Similarly, U.S. patent application publication no. 2001/0051293 A1 discloses a wicking structure made from an absorbent material in fluid communication with a refillable fuel reservoir. The wicking structure's function is to bring fuel to the PEM by capillary action in regulated amounts. However, this reference does not describe the method for regulating fuel flow, or how the wicking structure maintains contact with the fuel when the fuel level is less than full for capillary action to work.

U.S. Pat. No. 6,326,097 B1 discloses, among other things, fuel ampoules that can be filled with fuel permeable materials that allow the fuel to be communicated via capillary action in any orientation to a fuel needle to be wicked to the PEM. These fuel ampoules cannot store a sufficient amount of fuel, because for capillary action to work properly the spacing within the permeable materials is necessarily small. Hence, the fuel permeable materials take up most of the space in the ampoules, thereby reducing the storage capability. This reference also discloses a hand-operated pump, i.e., a dimpled area on the ampoules, for the user to push to pump fuel. This pump is also impractical since it requires the user to pump before power can be supplied to the electronic devices, and may require the user to continually pump the fuel cell to maintain the flow of fuel to the PEM. Additionally, each hand pumping action may send a surge of fuel to the PEM, and may cause an undesirable surge in the electrical output from the fuel cell to the electronic devices. Importantly, the '097 reference provides no teaching as to how the unused fuel absorbed by the permeable materials can be transported to the PEM.

U.S. patent application publication no. 2002/0018925 A1 discloses a cavity in an electronic device, where a balloon containing fuel is stored or where an absorbing solid containing fuel is stored for use with a fuel cell. Similar to the '097 reference, this absorbing material would take up most of the space in the fuel tank and would retain fuel within the absorbing materials, thereby reducing effective fuel storage capacity.

U.S. Pat. No. 6,447,941 B1 discloses a plurality of horizontal fuel permeating layers that are in contact with fuel in a fuel tank, and the fuel is communicated by capillary action from the fuel storage to the fuel permeating layers. The fuel is then evaporated in fuel evaporating layers before reaching the anode terminal. This fuel tank does not have any internal structure to aid in the transport of fuel.

U.S. Pat. No. 6,460,733 B2 discloses a multi-walled fuel container comprising an inner container of a methanol fuel disposed inside an outer container. The inner container may have rigid walls or may be a distensible bladder. The plenum area between the two containers comprises agents or additives that neutralize the methanol fuel in case of breakage or before disposal. The fuel is fed to a fuel reservoir or directly to the anode electrode by gravity or by a pressurized gas source located within the outer reservoir. An external pump is provided to communicate the fuel to the PEM.

U.S. Pat. Nos. 5,709,961 and 6,268,077 B1 disclose pressurized fuel tanks to communicate fuel to the fuel cell.

Hence, there remains a need for a fuel storage device that possesses high storage capacity and does not require a pressurized source to transport the fuel to the PEM from the storage device.

SUMMARY OF THE INVENTION

Hence, the present invention is directed to a fuel cartridge adapted for use with a fuel cell.

The present invention is also directed to a fuel cartridge adapted for use with a direct methanol fuel cell.

The present invention is also directed to a single use fuel cartridge and also to a refillable fuel cartridge.

The present invention is also directed to stackable fuel cartridges or fuel cartridges having multiple fuel chambers.

A preferred embodiment of the present invention is directed to a fuel cartridge containing fuel suitable for use with a fuel cell. The fuel cartridge comprises a free space portion and a filler insert. The filler insert comprises an absorbent material capable of wicking fuel contained within the cartridge by capillary action, and the filler insert is substantially in contact with the fuel at any orientation of the cartridge and at any fuel level. The filler insert comprises preferably less than about 67%, more preferably less than about 50% and even more preferably less than about 33% of the volume of the cartridge.

In accordance with one aspect of this embodiment, the filler insert comprises a connecting column and at least two disks. The disks are preferably located at the ends of the connecting column. The connecting column and/or at least one disk are preferably covered by a fluid impermeable film. Preferably, the filler insert further comprises an outlet port for fuel to leave the cartridge. The outlet port may be made from absorbent material, or may comprise a capillary needle or a bundle of capillary tubes. Alternatively, the filler insert comprises a connecting column and a plurality of spokes, and may further comprise a plurality of rings, wherein the spokes connect the connecting column to the rings.

In accordance with another aspect of this embodiment, the filler insert comprises a shell covering at least a portion of the inner surface of the cartridge and an outlet port. The filler insert may further comprise at least one disk and/or a connecting column. The shell may also cover the entire inner surface of the cartridge.

The absorbent material of the filler insert can be made from polymeric fibers, such as polyester, polyethylene, polyolefin, polyacetal, or polypropylene fibers, or from plant-based fibers, such as hemp, cotton, or cellulose acetate.

The cartridge may further comprise an air vent and a refillable valve. The air vent prevents a partial vacuum from forming within the cartridge, as fuel is withdrawn. The air vent may be an air valve or an opening covered by a hydrophobic micro-membrane. The air vent may also allow vapors or gases to vent from the cartridge.

In accordance with another aspect of this embodiment, the fuel cartridge is operatively connectable to a pump to control the flow of fuel from the cartridge. Preferably, the pump is a microelectromechanical system (MEMS) pump. The MEMS pump can be either a field-induced pump or a membrane-displacement pump. A field-induced pump has an AC or DC electrical field or magnetic field applied to the fuel to pump the fuel. Suitable field-induced pumps include, but are not limited to, electrohydrodynamic pump, magnetohydrodynamic pump and electro-osmotic pump. The electrohydrodynamic pump and an electro-osmotic pump can be used together. A membrane-displacement pump comprises a membrane and a force is applied to the membrane causing the membrane to move or vibrate to pump the fuel. Suitable membrane-displacement pumps include, but are not limited to, electrostatic pump and thermopneumatic pump. The MEMS pump controls the speed of the flow of fuel and reverses the flow, as well as stopping the flow.

Another preferred embodiment of the present invention is directed to a fuel cartridge containing fuel suitable for use with a fuel cell comprising a filler insert and a MEMS pump to control the flow of fuel. The filler insert comprises an absorbent material capable of wicking fuel contained within the cartridge by capillary action, and wherein the filler insert is substantially in contact with the fuel at any orientation of the cartridge and at any fuel level.

In accordance with one aspect of this embodiment, the fuel cartridge further comprises a first free space portion and a second space portion, wherein the filler insert occupies the second space portion. The filler insert comprises preferably less than about 67%, more preferably less than about 50% and even more preferably less than about 33% of the volume of the cartridge.

In accordance with another aspect of this embodiment, the filler insert may have any of the structures discussed above. The absorbent material of the filler insert can be made from polymeric fibers or plant-based fibers. The cartridge may further comprise an air vent and a refillable valve. The MEMS pump can be either a field-induced pump or a membrane-displacement pump, as discussed above.

Another preferred embodiment of the present invention is directed to a fuel cartridge containing fuel suitable for use with a fuel cell, wherein the cartridge comprises a plurality of chambers. Each chamber has a predetermined concentration of fuel, and each chamber comprises a filler insert made from an absorbent material capable of wicking fuel contained within the chamber by capillary action. The filler insert is substantially in contact with the fuel at any orientation of the chamber and at any fuel level.

The concentrations of fuel in the chambers are preferably different from each other. The concentration of fuel range from about 100% fuel and 0% water to about 0% fuel and 100% water. The chambers may be positioned side-by-side or end-to-end to each other.

In accordance with one aspect of this embodiment, at least one chamber comprises a first free space portion and a second space portion, wherein the filler insert occupies the second space portion. The filler insert comprises preferably less than about 67%, more preferably less than about 50% and even more preferably less than about 33% of the volume of the chamber.

In accordance with another aspect of this embodiment, the filler insert may have any of the structures discussed above. The absorbent material of the filler insert can be made from polymeric fibers or plant-based fibers. The cartridge may further comprise an air vent and a refillable valve. The MEMS pump can be either a field-induced pump or a membrane-displacement pump, as discussed above. The fuel in each chamber is preferably pumped at a different rate, and preferably the fuels from the chambers are mixed after being pumped from the chambers.

BRIEF DESCRIPTION OF THE DRAWINGS

In the accompanying drawings, which form a part of the specification and are to be read in conjunction therewith and in which like reference numerals are used to indicate like parts in the various views:

FIG. 9 is another preferred embodiment of the fuel cartridge of the present invention with details omitted for clarity having a plurality of fuel chambers;

FIG. 10 is another preferred embodiment of the fuel cartridge of the present invention with details omitted for clarity having a plurality of fuel chambers schematically connected to an optional diffuser/mixing element and to the MEA; and FIG. 11 is an alternative embodiment of the filler insert shown in FIGS. 1 and 2 with protective sheathing.

DETAILED DESCRIPTION OF THE PREFERRED EMBODIMENTS

Figure 1:
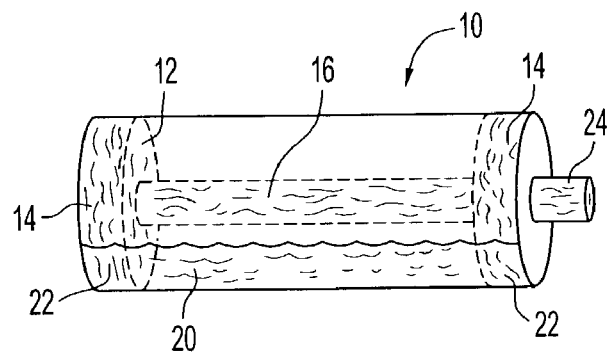
FIG. 1 is a front view of a preferred fuel cartridge oriented in an arbitrary position in accordance with the present invention.

As illustrated in the accompanying drawings and discussed in detail below, the present invention is directed to a versatile fuel cartridge for storing fuel cell fuels such as methanol and water, methanol/water mixture, methanol/water mixtures of varying concentrations or pure methanol. The fuel cartridge may contain other types of fuel cell fuels, such as ethanol, or other chemicals that may improve the performance or efficiency of fuel cells, and the present invention is not limited to any type of fuels or liquids contained in the cartridge. The term "fuel" as used herein includes all fuels that can be reacted in fuel cells, and includes all of the above suitable fuels, liquids, and/or chemicals and mixtures thereof. The present invention utilizes a filler insert, which preferably occupies a small portion of the volume of the fuel cartridge, so that the fuel cartridge may hold more fuel to ensure a long life of the fuel cartridge, and to minimize the retention of fuel in the cartridge at the end of the useful life of the cartridge. The filler insert is capable of wicking and transporting the fuel to the MEA. Additionally, the filler insert remains substantially in physical contact with the fuel in any orientation of the fuel cartridge and at any fuel level in the fuel cartridge.

Optionally, the fuel cartridge may also include a pump to initiate, maintain and/or control fuel flow from the fuel reservoir. The pump may also regulate the flow of fuel to the MEA to increase or decrease the electrical current output from the MEA, and importantly to shut off the flow of fuel, when necessary. Alternatively, a shut-off valve may be used to ensure that the flow of fuel is shut off when the electronic device is shut-off or when the cartridge is separated from the device. The pump or pumps may also mix pure methanol with water before pumping the mixture to the MEA. The pump may also selectively pump methanol/water mixture from different reservoirs having varying methanol concentrations.

Preferably, the pump is adapted for use with low liquid flow rate, and preferably is available in small sizes for use with consumer electronic devices. Preferably, the pump has a minimal number of moving parts or more preferably no moving part to minimize breakage. Preferably, suitable pumps include microelectromechanical systems (MEMS) pumps, such as those used to pump ink in inkjet printers or those used in drug delivery systems or those used to cool micro integrated circuit chips, among others. More specifically, suitable MEMS pumps include field-induced flow pumps and membrane-displacement pumps. Field induced pumps utilize an electrical or magnetic field to produce flow. A suitable field-induced pump is an electro-osmotic pump, which is capable of moving liquid in small spaces, such as capillary spaces, by applying a direct circuit (DC) potential across at least a portion of a capillary column. The direction of fluid flow in the capillary column can also be reversed or stopped by reversing the direction of the DC potential. Other suitable field-induced pumps include, but are not limited to, electrohydrodynamic pumps and magnetohydrodynamic pumps. Membrane-displacement pumps utilize a force, e.g., an electrical charge, applied to a membrane, causing the membrane to move or vibrate to propel the fluid-to-be-pumped. Suitable membrane-displacement pumps include, but are not limited to electrostatic pumps and thermopneumatic pumps.

As shown in FIG. 1, fuel cartridge 10 comprises a free space portion and a portion occupied by filler insert 12. Free space portion indicates that the space may be occupied by fuel or gas when the fuel level is less than full, but otherwise not occupied by other substances or materials. Insert 12 is preferably made from an absorbent material. Suitable absorbent materials include, but are not limited to, sponges and fibrous polymers such as polyester, polyethylene, polyolefin, polyacetal, polypropylene fibers, or from natural fibers such as hemp, cotton, or cellulose acetate or other plant-based fibers. Preferably, if polymeric fibers are used, these fibers are either thermoset or thermoplastic with high softening or melting temperature to withstand potentially high internal temperatures that may exist inside the fuel cells or inside the electronic devices. Filler materials of any porosity or permeability can be used, so long as the filler materials can wick fuel at a sufficient flow rate. Insert 12 preferably comprises two bases or disks 14 and a connecting column 16. Insert 12 preferably occupies less than about 67% of the internal volume of cartridge 10, more preferably less than about 50% and even more preferably less than about 33%, so that the free space portion and the interstitial volume within insert 12 may be used to hold fuel 20. Alternatively, insert 12 may occupy all of the internal volume of cartridge 10, preferably when cartridge 10 is utilized with a MEMS pump.

In FIG. 1, cartridge 10 is shown arbitrarily in the horizontal position to replicate an electronic device, such as a calculator or PDA, being used. In this position, liquid fuel 20, which is shown as partially empty, may make contact with filler insert 12, so that fuel 20 may be communicated to insert 12 at contact points 22 for wicking to the MEA. Fuel is then transferred out of cartridge 10 via outlet port 24. Outlet port 24 may contain the same filler material as insert 12, so that fuel 20 may be continually wicked out of cartridge 10. Alternatively, outlet port 24 may comprise a single capillary needle or a bundle of capillary tubes. More preferably, outlet port 24 comprises a material more suitable with the selected pump to optimize flow from the cartridge and to control same. For example, if an electro-osmotic pump is used, outlet port 24 preferably comprises glass or fused-silica capillary tubes or beads.

Figure 2:
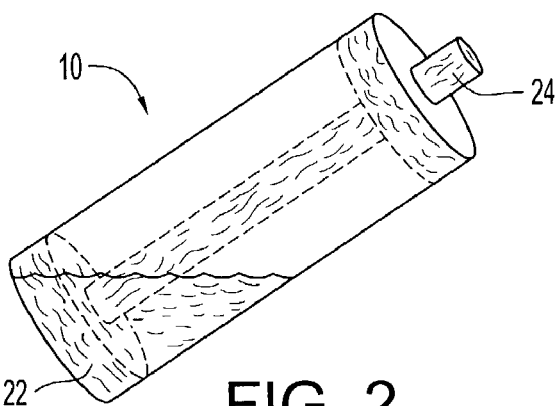
FIG. 2 is a front view of the fuel cartridge of FIG. 1 orientated in another arbitrary position.
Figure 3A:
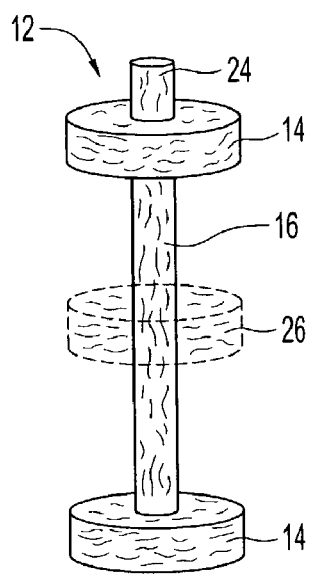
FIG. 3(a) is a front view of a preferred embodiment of the filler insert in accordance with the present invention.
Figure 3B:
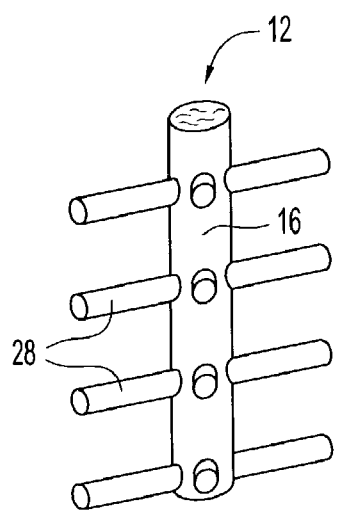
FIGS. 3(b)–3(d) are various views of another preferred embodiment of the filler insert.
Figure 3C:
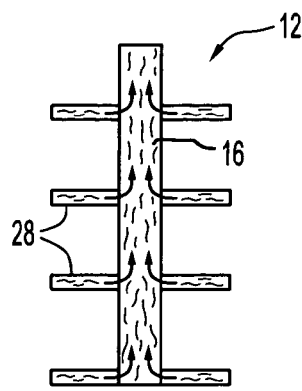
Figure 3D:
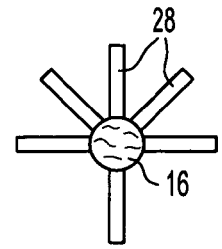
Figure 3E:
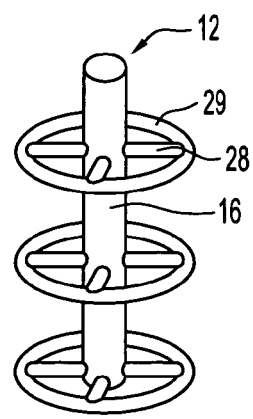
FIGS. 3(e)–3(g) are various views of another preferred embodiment of the filler insert.
Figure 3F:
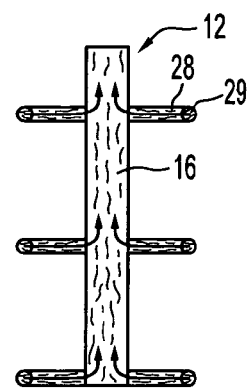
Figure 3G:
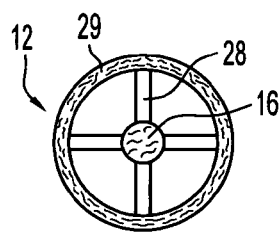
Figure 4A:
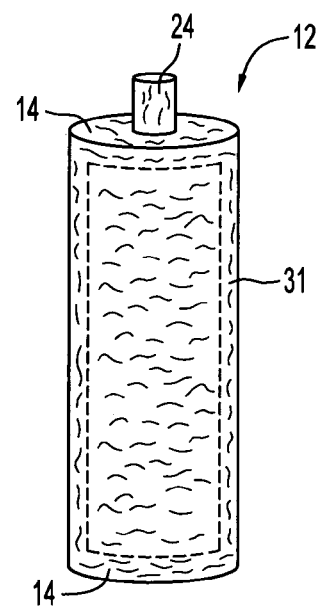
FIG. 4(a) is a front view with a partial cutaway of another preferred embodiment of the filler insert in accordance with the present invention.
Figure 4B:
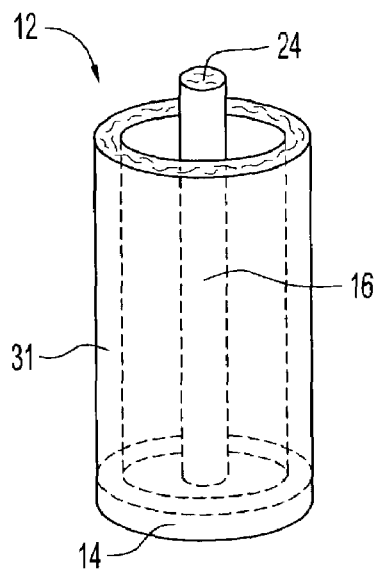
FIGS. 4(b) and 4(c) are various views of another preferred embodiment of the filler insert.
Figure 4C:
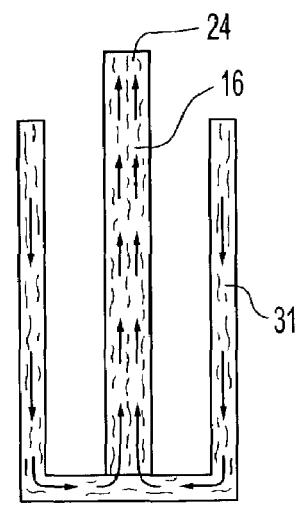
Figure 4D:
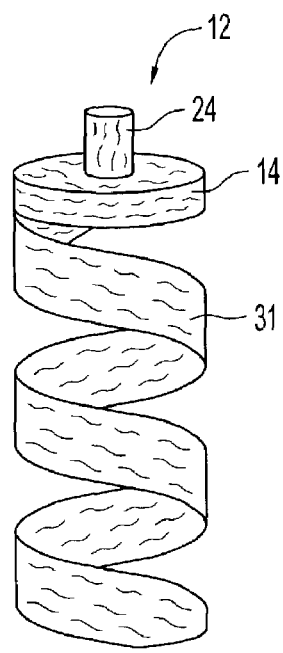
FIGS. 4(d) and 4(e) are front views of other preferred embodiments of the filler insert.
Figure 4E:
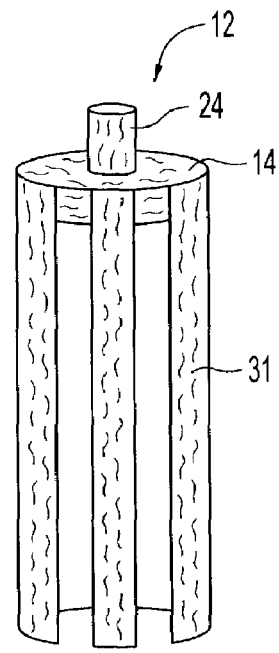

As illustrated in FIG. 2, cartridge 10 can also be arbitrarily positioned at any tilt angle and fuel 20 would substantially maintain its contact with filler insert 12 at contact point(s) 22. Similarly, when cartridge 10 is positioned vertically, such that outlet port 24 is positioned either at the top or bottom, the fuel remaining in cartridge 10 substantially maintains contact with disk 14 of filler insert 12.

Alternatively, as shown in FIG. 3(*a*), filler insert 12 may comprise additional disk(s) 26 located between disks 14. Disk 26 may have any orientation, including but are not limited to, being parallel to disks 14. Disk 26 may be positioned diagonally between disks 14. For additional structural support, connecting column 16 may be covered by a thin plastic film 25, as shown in FIG. 11. Advantageously, such thin film improves the flow of liquid through insert 12 by preventing air or other gases from entering the filler material. Alternatively, thin plastic film 25 may also at least partially cover disk 14, 26, and seals 27 may be provided where the film covering column 14 intersects the film covering disk 14, 26.

FIG. 3(*b*) illustrates another variation of filler insert 12, which comprises column 16 and a plurality of spokes 28. FIG. 3(*c*) is a cross-sectional view of FIG. 3(*b*) showing a preferred fuel flow path within the insert. Spokes 28 may be aligned in straight lines as shown in FIGS. 3(*b*) and 3(*c*) or may be unaligned as shown in FIG. 3(*d*). FIG. 3(*e*) illustrates another variation of filler insert 12, which comprises column 16, spokes 28 and rings 29. FIG. 3(*f*) is a cross-sectional view of FIG. 3(*e*) showing a preferred fuel flow path within the insert, FIG. 3(*g*) is a top view of FIG. 3(*e*). Spokes 28 can also be aligned or unaligned in this embodiment.

In another preferred embodiment, filler insert 12 may comprise outlet port 24, disks 14 and a shell 31. FIG. 4(*a*), shown with a portion of shell 31 removed for clarity, illustrates this embodiment. Since shell 31 and disks 14 would cover the entire inside surface of cartridge 10, fuel 20 would always remain in contact with insert 12 at any fuel level and at any orientation of the cartridge. It is important to note that it is not necessary for shell 31 and disks 14 to completely cover the inside surface of cartridge 10 for fuel 20 to substantially maintain contact with insert 12. For example, as shown in FIGS. 4(*d*) and 4(*e*), shell 31 may have a spiral shape or may comprise a plurality of spaced-apart strips, respectively, and partially covers the inner surface of the cartridge. As shown in FIGS. 4(*d*) and 4(*e*), insert 12 may also have outlet port 24 and one disk 14. Alternatively, this embodiment may also have second disk 14 and connecting column 16. Furthermore, as shown in FIG. 4(*b*), filler insert 12 comprises outlet port 24, column 16, disk 14 and shell 31 connected serially in the manner shown. FIG. 4(*c*) is a cross-sectional view of FIG. 4(*b*) showing the preferred fuel flow path within the insert.

Figure 5A:
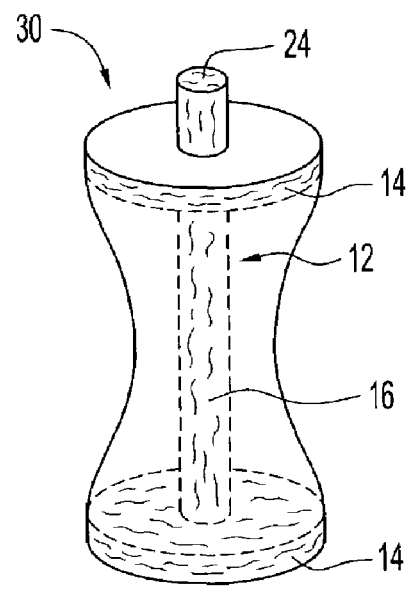
FIGS. 5(a), 5(b) and 6 are alternative embodiments of the fuel cartridge shown in FIGS. 1 and 2.
Figure 5B:
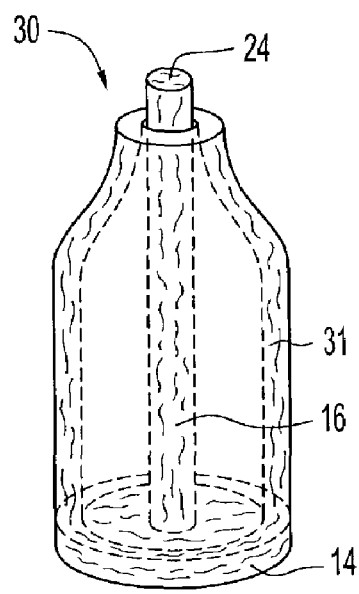

Advantageously, filler insert 12 may be used with other cartridges such as cartridge 30, which have outer surfaces with varying curvature, e.g., the hourglass-shaped cartridge shown in FIG. 5(*a*) or the bottle-shaped cartridge shown in FIG. 5(*b*). As illustrated, the filler insert shown in FIGS. 1–2 is used with cartridge 30 in FIG. 5(*a*) and the filler insert shown in FIGS. 4(*b*)–4(*c*) is shown with cartridge 30 in FIG. 5(*b*). Disks 14 and/or rings 29 can also be modified to other shapes, such as hexagonal disks 34, to be utilized in cartridge 32 shown in FIG. 6. Hence, as used herein, the term "disk" or "ring" is not limited to any particular shape and includes circular and non-circular shapes as well as regular and irregular shapes.

As fuel is withdrawn from cartridge 10, 30 or 32, a partial vacuum may be created within the cartridge. This partial vacuum tends to force the fuel to flow back into the cartridge or it may pull water from the fuel cell reaction into the cartridge. This effect can work against the capillary effect of filler insert 12 to draw fuel out of the cartridge. To overcome this effect, when the electronic consumer device is not in used, air or $CO_2$ produced by the fuel cell reaction may be allowed to flow into the cartridge through outlet port 24 to eliminate the partial vacuum. In applications where outlet port 24 is connected in an airtight manner to the MEA or where the fuel cell is used continuously for a long period of time, a vent 36 may be provided to allow air to enter the cartridge to equalize the internal pressure of the cartridge to the external pressure. Vent 36, shown schematically in FIG. 6, can be a one-way valve that only allows air to enter but does not allow fuel or other liquids to exit. Alternatively, vent 36 is an opening covered by a hydrophobic membrane, such that methanol, water or other liquids cannot pass through but air is allowed to enter the cartridge. Hydrophobic membranes can be made from polytetrafluoroethylene (PTFE), nylon, polyamides, polyvinylidene, polypropylene, polyethylene or other polymeric membrane. A commercially available hydrophobic PTFE microporous membrane can be obtained from W.L Gore Associates, Inc. Additionally, a refill valve 38 may be provided to add fuel to cartridge 10, 30, 32 when necessary. It is important to note that while air vent 36 and valve 38 are illustrated in connection with FIG. 6, these devices are applicable to all cartridge embodiments shown and claimed herein.

To ensure that the fuel flow from outlet port 24 of the fuel cartridge to the MEA is regulated, an optional pump is provided. Any pump can be used so long as fuel can be pumped from the cartridge in a regulated manner. Preferably, the pump is a MEMS pump to minimize the size of the pump. Electro-osmotic pump is one of the MEMS pumps usable with the present invention. As shown in FIGS.

7(a)–7(c), an electro-osmotic pump 39 is provided. Electro-osmotic pump 39 contains no moving parts and is capable of moving fluids through tight spaces. Electro-osmotic pump advantageously can move fluid with low conductivity. An electro-osmotic flow is created when a DC potential is applied across a porous media. The liquid in the porous media is driven from the anode or positive electrode to the cathode or negative electrode, when exposed to the DC electrical field. Electro-osmotic pump is particularly useful in micro-channels, such as those within filler insert 12 or outlet port 24, and in slow and controlled flow, which is very useful in DMFC. Electro-osmotic flow is discussed in details in U.S. Pat. No. 3,923,426 entitled, "Electroosmotic Pump and Fluid Dispenser Including Same," issued on Dec. 2, 1975, in "Electroosmotic flow pumps with polymer frits" by S. Zeng, C. Chen, J. Santiago, J. Chen, R. Zare, J. Tripp, F. Svec and J. Frechet, published in Sensors and Actuators B Chemical Journal, vol. 82, pp. 209–212 (2002), and in "A Large Flowrate Electroosmotic Pump with Micron Pores," by S. Yao, D. Huber, J. Mikkelsen and J. Santiago, proceedings of IMECE, 2001 ASME International Mechanical Engineering Congress and Exposition, Nov. 11–16, 2001, New York, N.Y., among other references. These references are incorporated by reference herein in their entireties.

Figure 7A:
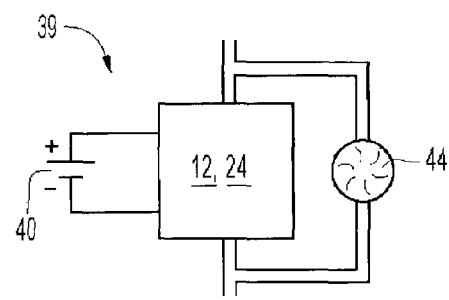
FIGS. 7(a)–7(b) are schematic views of alternative embodiments of an electro-osmotic pump controlling or regulating the flow of methanol fuel and/or water from the fuel cartridge(s) to the MEA.
Figure 7C:
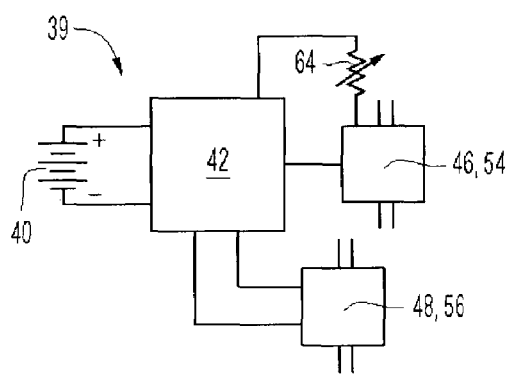
Figure 7B:
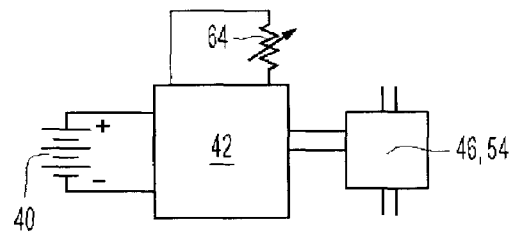

As shown in FIG. 7(a), a DC potential can be applied across entire insert 12 to ensure that the fuel flow out of cartridge 10 is regulated. More preferably, a DC potential is applied across only outlet port 24, since less voltage is required and once the fuel begins to flow through outlet port 24 momentum is transferred to the remaining fuel through viscous interaction. Battery 40 is selected to have any potential necessary to induce fuel flow. One or more batteries 40 can be stacked in series to increase the applied DC potential, as shown in FIGS. 7(b) and 7(c). Alternatively, a DC—DC converter can be used to increase the DC potential output. The DC—DC converter converts low voltage DC to alternating current (AC) voltage (or to electrical pulses), and then transforms the low AC voltage to higher AC voltage before reconverting it to DC voltage. Advantageously, DC—DC converters are available in small sizes. When the fuel stored in the free space of the fuel cartridge is used up, electro-osmotic pump 39 can pump fuel out of insert 12 to render most of this fuel usable. To minimize the draw from battery 40, the electrical potential from the fuel cell can be used to power the electro-osmotic flow once the fuel cell is operational. Preferably, controller 42 is provided to control the potential and/or to invert the polarity of battery 40.

In accordance with one aspect of the present invention, battery 40 is rechargeable so that the current from the fuel cell, when it is in operation, may recharge battery 40. Advantageously, battery 40 can be continually recharged to prolong battery life, and the consumer may not realize that a battery is used within the fuel cell. In accordance with another aspect of the present invention, a manual pump 44, such as a hand-operated air pump, can be provided to manually pump the fuel to activate the MEA when the battery 40 is run down, or after a long period of inactivity the fuel is drained from outlet port 24 or from most of insert 12, or when the capillary spacing is blocked.

Figure 6:
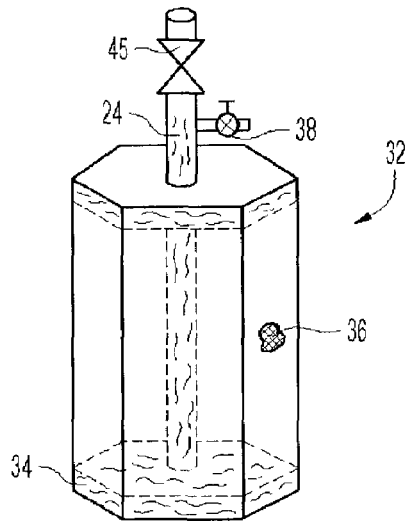
Figure 8A:
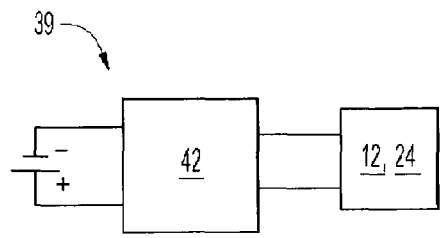
FIGS. 8(a)–8(b) are schematic views of the electro-osmotic pump with reversed polarity to stop the flow of fuel, and being electrically isolated from the fuel cartridge, respectively.
Figure 8B:
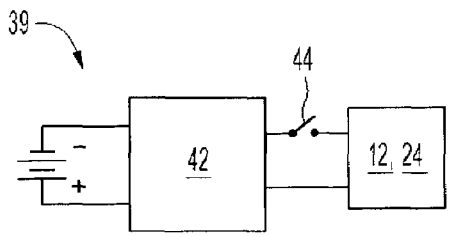

Another advantage of electro-osmotic pump 39 is that when the MEA needs to be shut down, controller/inverter 42 can reverse the polarity of battery 40 so that fuel is forced to flow away from the MEA to stop the fuel cell reaction to disengage the electrical circuit, as shown in FIG. 8(a). Alternatively, a shut-off valve 45, as shown in FIG. 6, may be provided to isolate the fuel from the MEA. Shut-off valve 45 can also help prevent the unintended discharge of fuel from the fuel cartridge, when the cartridge is separated from the electronic device. Shut-off valve can be positioned either above or below refill valve 38. Shut-off valve 45 can be a normally opened valve or a normally closed valve, as discussed in commonly-owned U.S. Pat. No. 5,520,197. The '197 patent is hereby incorporated by reference in its entirety.

After the fuel cell's electrical production is stopped, a manual or electronic switch 44 is opened to remove any DC potential across filler insert 12 or outlet port 24. Controller 42, for example, can be operatively connected to the on/off switch of the consumer electronic device, such that when the device is turned on, a DC potential is applied across insert 12 or outlet port 24. When the device is turned off, the DC potential is reversed and then disconnected. Controller 42 may also control the rate of fuel flow from the fuel cartridge by varying the DC potential applied. One method of varying the DC potential is described below.

Battery 40 and controller/inverter 42 may be located on the fuel cartridge, preferably when the cartridge is refillable, or may be located in the fuel cell so that the costs for producing the fuel cartridges may be reduced to make the fuel cartridge disposable after a single-use.

In accordance with another aspect of the invention, fuel cartridge 10 may comprise two or more chambers. As shown in FIG. 9, fuel cartridge 10 may have chambers 46 and 48, where one chamber is located on top of the other chamber. Preferably, one contains methanol and the other contains water. A filler insert is included in each chamber. In the embodiment shown in FIG. 9, the connecting column 50 of chamber 48 is disposed concentrically inside connecting column 52 of chamber 46. Preferably, column 50 is isolated from column 52 by a waterproof film. As shown, each column is connected to disks to ensure that the liquid contained therein is wicked out of the chambers. Alternatively, the chambers can be positioned side-by-side, such as chambers 54 and 56 illustrated in FIG. 10. Each chamber 54, 56 contains a filler insert comprising a connecting column 58, 60, respectively, and disks to wick the liquids out of the chambers. In the embodiments shown in FIGS. 9 and 10, the methanol and water streams need to be combined or mixed before reaching the MEA. Preferably, the liquids are mixed in diffuser or mixing zone 62. Preferably zone 62 is filled with the same filler material as insert 12 to spread the fuel mixture by capillary action before reaching the MEA. Additionally, a pre-mixing chamber may be provided upstream of diffuser or mixing zone 62, so that the liquids may be thoroughly mixed before reaching the diffuser 62.

Different fuel cells may require different concentrations of methanol to water in the fuel mixture for operation. This can be accomplished by the electro-osmotic pump shown schematically in FIG. 7(c). The same DC potential can be applied to chambers 46, 48 or 54, 56. Due to the different viscosity and surface tensions of methanol and water, the flow rate of methanol and water may be different. Controller/inverter 42 may have multiple outputs, and each output may have a different voltage to regulate the flows out of the chambers. Alternatively, in one preferred embodiment, each output may have a variable resistor 64 to adjust the voltage of the output as illustrated in FIG. 7(b). Alternatively, the variable resistor can be located in series with the chamber to adjust the voltage applied to the chamber, as illustrated in FIG. 7(c).

Alternatively, chambers 46, 48 or 54, 56 may contain fuel mixtures of different concentrations or compositions, and electro-osmotic pump 39 can selectively pump the fuel mixture out of one or the other chamber depending on the power consumption requirements. This can be accomplished by increasing the resistance in resistor 64 connected with the unneeded chamber, so that it is significantly higher than the impedance or resistance of the filler insert in the chamber. When the resistance of resistor 64 is sufficiently high, the DC potential across the filler insert is insignificantly small thereby effectively stopping the flow from the unneeded chamber and only allowing the flow to come from the selected chamber. The fuel mixtures in the two or more chambers may be mixed together before reaching the MEA, as explained above. Alternatively, each chamber may have its own pump to regulate or control the flow of fuel therefrom.

In accordance with other embodiments of the invention, other pumps can be utilized with fuel cartridges 10, 30, 32 or other fuel cartridges. As stated above, other suitable pumps include, but are not limited to, field-induced pumps such as electrohydrodynamic pumps and magnetohydrodynamic pumps. Other suitable pumps include membrane-displacement pumps, such as electrostatic pumps and thermopneumatic pumps.

An electrohydrodynamic pump applies an AC voltage field to a fluid-to-be-pumped. An example of an electrohydrodynamic pump is disclosed in U.S. Pat. No. 4,316,233, entitled "Single Phase Electrohydrodynamic Pump," issued on Feb. 16, 1982. The '233 patent is hereby incorporated by reference in its entirety. An electrohydrodynamic pump generally works by the attractive and repulsive forces exerted on the fluid by an electric field through Coulombic reaction. Since the electrical field acts on the fluid and not through mechanical pressure, the internal pressure within the fluid does not increase significantly due to the pumping. An electrohydrodynamic pump is particularly suitable for liquid with low electrical conductivity. As disclosed in and shown in the figures of the '233 patent, an AC charge is applied to a flow conduit, wherein the flow conduit comprises a plurality of internal projections of semi-insulating material hanging from the conduit wall. This flow conduit advantageously can be outlet port 24 of filler insert 12. The projections are made from different materials having different electrical relaxation times, such that the electrical charge for each projection reaches its peak at different times. This creates an AC electrical field in the fluid. For example, if the AC charge is a sinusoidal voltage, the voltages at the tips of the projections cause a sinusoidal electrical field to pump the fluid in a desired direction. Alternatively, the projections can be made from the same materials but have different dimensions to have different relaxation times. The projections may be spaced apart or positioned adjacent to each other. The projections may also have any geometrical shapes.

It is known that electrohydrodynamic flow can be used in combination with electro-osmotic flow to pump fluid, and it has also been reported that electrohydrodynamic and electro-osmotic pumps can be used together to pump methanol and ethanol through capillary tubes.

A magnetohydrodynamic pump, on the other hand, applies a magnetic field to a working fluid to move the working fluid in any desired direction. The flow of working fluid can be reversed by reversing the magnetic field. An example of a magnetohydrodynamic pump is disclosed in U.S. Pat. No. 6,241,480, entitled "Micro-magnetohydrodynamic Pump and Method for Operation of the Same," issued on Jun. 5, 2001. The '480 patent is incorporated herein by reference in its entirety. Any conductive liquid can be the working fluid. Preferably, the working fluid is a highly viscous, liquid metal, such as mercury or gallium alloys. In a preferred embodiment, the magnetohydrodynamic pump comprises a chamber having an inlet and an outlet with a mass of the liquid metal acting as a piston. A magnetic field generated by permanent magnet, electromagnet or an array of spiral magnetic inductors is applied to the working fluid to move the working fluid away from the inlet to draw the fluid-to-be-pumped into the chamber. The magnetic field is then reversed to pump the fluid out of the chamber through the outlet. The magnetohydrodynamic pump may have an additional chamber for holding the liquid to be pumped. Each of the inlet and outlet preferably has a check valve to control the flow of the fluid-to-be-pumped. The inlet is preferably in fluid communication with outlet port 24 and the outlet is preferably in fluid communication with the MEA to transport the fluid to the MEA.

An electrostatic pump is a membrane-displacement pump, which is different than the field-induced pumps discussed above. Instead of applying an electrical or magnetic field (or both) to a fluid and pumping the fluid, a membrane-displacement pump typically includes a membrane or diaphragm and a force applied to the membrane or diaphragm to pump the fluid. In an electrostatic pump, an electrical potential is applied to a membrane or diaphragm causing the membrane or diaphragm to move or to vibrate to pump the fluid. An electrostatic pump is disclosed in U.S. Pat. No. 6,485,273, entitled "Distributed MEMS Electrostatic Pumping Devices," issued on Nov. 26, 2002. The '273 patent discloses, among other things, a MEMS pump, which has a movable membrane attached in a cantilevered manner to a substrate. The membrane is biased at the free end away from the substrate. When an electrostatic voltage is applied across a first electrode in the movable membrane and a second electrode in the substrate, the movable membrane moves toward the substrate. Such movement pumps any fluid-to-be-pumped located between the free end of the movable membrane and the substrate. When the electrostatic force is removed, the movable membrane is biased back to its original position. This cycle may be repeated to continually pump the fluid. Another electrostatic pump is disclosed in U.S. Pat. No. 5,336,062, entitled "Microminiaturized Pump," issued on Aug. 9, 1994. The '062 patent discloses, among other things, an electrostatic pump having at least one membrane. When an AC voltage is applied to the membrane through its "ohmic" contact, the membrane vibrates to pump fluid. The '062 patent also discloses a two membrane embodiment, where two AC voltages having different phases and voltages are applied to the membranes, such that the membranes may vibrate in opposite phase to one another to pump fluid. The disclosure of the '273 patent and the '062 patent are incorporated herein by reference in their entireties.

A thermopneumatic pump is another membrane-displacement pump. In this pump a heating element, e.g., a resistive heating element, is disposed in a pressure chamber and the pressure chamber is operatively connected to the membrane. Enclosed in the chamber is a quantity of either working gas or working liquid that expands when heated. Suitable working liquids include fluorinated hydrocarbon liquids available from 3M. Such thermal expansion generates a force against the membrane and moves the membrane. The movement of the membrane pumps the fluid-to-be-pumped. A reduction in temperature of the enclosed working gas or liquid contracts the membrane. Thermopneumatic pump and other membrane displacement micropumps are disclosed in U.S. Pat. No. 6,069,392, entitled "Microbellows Actuator," issued on May 30, 2000 and U.S. Pat. No. 6,326,211, entitled "Method of Manipulating a Gas Bubble in a Microfluidic Device" issued on Dec. 4, 2001. These references are incorporated by reference in their entireties.

The fuel cartridges 10, 30, 32 described above can be used with DMFC, or can be incorporated with a reformat to convert the methanol to hydrogen to be used with methanol reformat fuel cells.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments, which would come within the spirit and scope of the present invention.

I claim:

1. A fuel cartridge containing fuel suitable for use with a fuel cell comprising a filler insert and the fuel cartridge is operatively connectable to a microelectromechanical pump to control the flow of fuel out of the cartridge, wherein the filler insert comprises an absorbent material capable of wicking fuel contained within the cartridge by capillary action, and wherein the filler insert is substantially in contact with the fuel at any orientation of the cartridge and at any fuel level, and wherein a fluid impermeable material covers at least a portion of the filler insert.

2. The fuel cartridge of claim 1 further comprising a first free space portion and a second space portion, wherein the filler insert occupies the second space portion.

3. The fuel cartridge of claim 2, wherein the filler insert comprises less than about 67% of the volume of the cartridge.

4. The fuel cartridge of claim 3, wherein the filler insert comprises less than about 50% of the volume of the cartridge.

5. The fuel cartridge of claim 4, wherein the filler insert comprises less than about 33% of the volume of the cartridge.

6. The fuel cartridge of claim 2, wherein the filler insert comprises a connecting column and at least two disks.

7. The fuel cartridge of claim 6, wherein the connecting column is covered by a fluid impermeable film.

8. The fuel cartridge of claim 6, wherein at least a portion of one disk is covered by a fluid impermeable film.

9. The fuel cartridge of claim 2, wherein the filler insert comprises a shell covering at least a portion of the inner surface of the cartridge.

10. The fuel cartridge of claim 2, wherein the filler insert comprises an outlet port.

11. The fuel cartridge of claim 1, wherein the absorbent material is made from polymeric fibers.

12. The fuel cartridge of claim 1, wherein the absorbent material is made from plant-based fibers.

13. The fuel cartridge of claim 1, wherein the cartridge further comprising an air vent.

14. The fuel cartridge of claim 1, wherein the cartridge further comprising a refillable valve.

15. The fuel cartridge of claim 1, wherein the microelectromechanical pump comprises a field-induced pump.

16. The fuel cartridge of claim 15, wherein the microelectromechanical pump comprises an electrical field applied to the fuel to pump the fuel.

17. The fuel cartridge of claim 16, wherein the electrical field is generated by a DC voltage.

18. The fuel cartridge of claim 16, wherein the electrical field is generated by an AC voltage.

19. The fuel cartridge of claim 15, wherein the microelectromechanical pump comprises a magnetic field applied to a working fluid to pump the fuel.

20. The fuel cartridge of claim 1, wherein the microelectromechanical pump comprises an electrohydrodynamic pump.

21. The fuel cartridge of claim 1, wherein the microelectromechanical pump comprises an electrohydrodynamic pump and an electro-osmotic pump.

22. The fuel cartridge of claim 1, wherein the microelectromechanical pump comprises a magnetohydrodynamic pump.

23. The fuel cartridge of claim 1, wherein the pump comprises an electro-osmotic pump.

24. The fuel cartridge of claim 1, wherein the microelectromechanical pump comprises a membrane-displacement pump.

25. The fuel cartridge of claim 24, wherein the microelectromechanical pump comprises a membrane and a force is applied to the membrane causing the membrane to move to pump the fuel.

26. The fuel cartridge of claim 1 further comprising a shut-off valve.

27. The fuel cartridge of claim 1, wherein the microelectromechanical pump is reversible.

28. A fuel cartridge containing a fuel suitable for use with a fuel cell comprising a filler insert and the fuel cartridge is operatively connectable to a microelectromechanical pump to control the flow of libel out of the cartridge, wherein the filler insert comprises an absorbent material capable of wicking fuel contained within the cartridge by capillary action, and wherein the filler insert is substantially in contact with the fuel at any orientation of the cartridge and at any fuel level, and wherein the filler insert comprises a connecting column and a plurality of spokes.

29. The fuel cartridge of claim 28, wherein the filler insert further comprises a plurality of rings, wherein the spokes connect the connecting column to the rings.

* * * * *

UNITED STATES PATENT AND TRADEMARK OFFICE
CERTIFICATE OF CORRECTION

PATENT NO. : 7,147,955 B2 Page 1 of 1
APPLICATION NO. : 10/356793
DATED : December 12, 2006
INVENTOR(S) : Paul Adams It is certified that error appears in the above-identified patent and that said Letters Patent is hereby corrected as shown below:

In claim 28, in column 14, line 43, please replace the word "libel" with the word --fuel.--

Signed and Sealed this

Tenth Day of June, 2008

JON W. DUDAS
*Director of the United States Patent and Trademark Office*